March 4, 1958
A. REDNISS ET AL
2,825,627
PRODUCTION OF HYDROGEN BROMIDE
Filed July 19, 1955
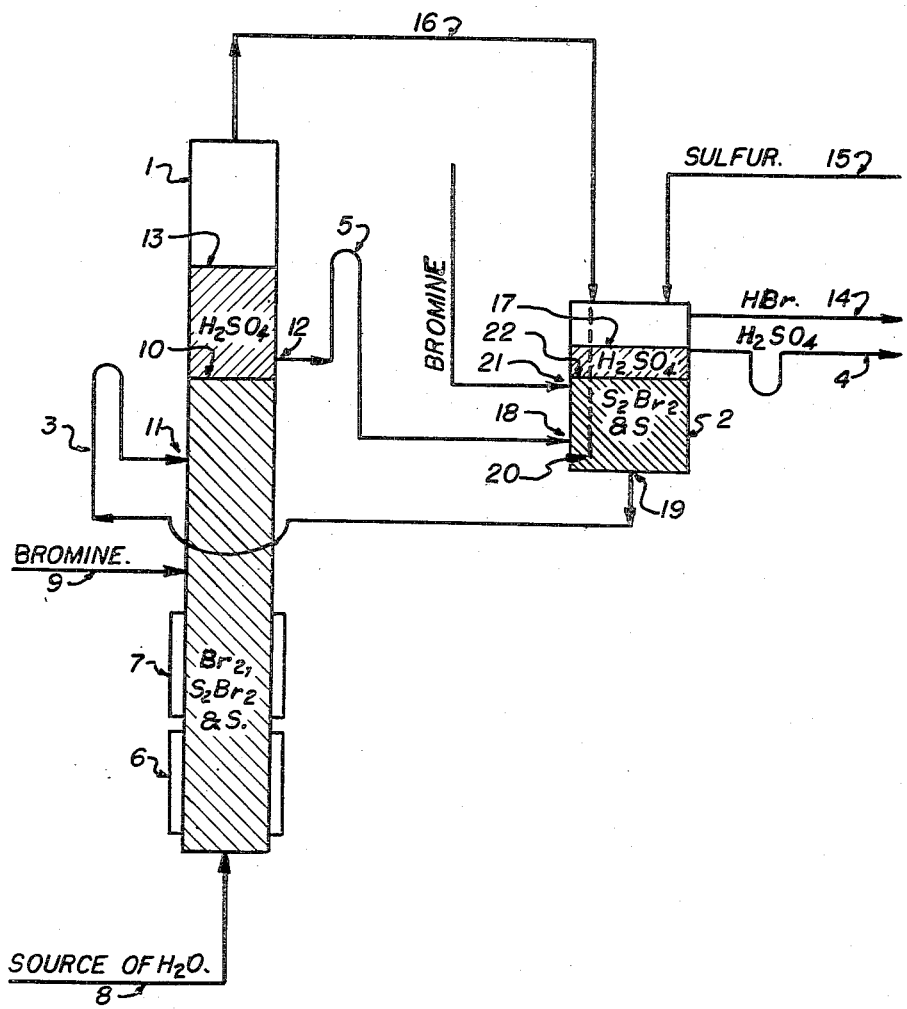
INVENTOR.
ALEXANDER REDNISS
SOLOMON GOODMAN
THEODORE CANTOR
BY *Morton Amster*
ATTORNEY 2,825,627

PRODUCTION OF HYDROGEN BROMIDE

Alexander Redniss and Solomon Goodman, New York, and Theodore Cantor, Yonkers, N. Y., assignors to Technical Enterprises Inc., New York, N. Y., a corporation of New York Application July 19, 1955, Serial No. 523,013

12 Claims. (Cl. 23—154)

This invention relates to the production of hydrogen bromide and more particularly to the continuous production of gaseous hydrogen bromide.

Hydrogen bromide is an invaluable chemical and reactant having a multitude of uses in treating, and reacting with, other substances, and the like. Many processes have accordingly been proposed for its production, and while a few such processes have been commercially adopted, they are for the most part not entirely satisfactory and are disadvantageous for one reason or another. Thus, the production of anhydrous hydrogen bromide by direct combination of bromine with hydrogen is known, but requires a source of hydrogen gas which is not always feasible, economically or otherwise. The production of hydrogen bromide by reaction of a strong mineral acid with a bromide salt, or with an aqueous solution of hydrogen bromide are also known; the former process yields a salt of the mineral acid of low economic value as by-product, while the latter yields a diluted mineral acid of low economic value as by-product. There have also been proposed methods for reacting bromine with water and a reducing agent, but these are for the most part batch processes, yield aqueous solutions of hydrogen bromide, and/or necessitate operation in gaseous or heterogeneous phase.

It is an object of this invention to provide an improved process for the production of gaseous hydrogen bromide. A further object of this invention is the provision of an improved process for simultaneously producing sulfuric acid and gaseous hydrogen bromide. Other objects and advantages will appear as the description proceeds.

The attainment of the above objects is made possible by the instant invention which comprises continuously admixing and reacting with bromine and a sulfur containing reducing agent, water at a rate approximating its rate of reaction with said bromine and reducing agent and continuously removing gaseous hydrogen bromide and sulfuric acid from the reaction mixture.

The overall chemical reactions involved in the formation of hydrogen bromide from bromine, water and a sulfur containing reducing agent are known, and may be depicted as follows:

$$3Br_2 + S + 4H_2O \rightarrow H_2SO_4 + 6HBr\uparrow$$
$$Br_2 + SO_2 + 2H_2O \rightarrow H_2SO_4 + 2HBr\uparrow$$
$$4Br_2 + H_2S + 4H_2O \rightarrow H_2SO_4 + 8HBr\uparrow$$

From the above equations, it will be evident that the reactions employed in the instant invention simultaneously yield both sulfuric acid and hydrogen bromide in varying proportions depending upon the particular reducing agent taking part in the reaction. Although sulfur is the preferred reducing agent for use in the instant invention, it will be seen that use of sulfur dioxide or hydrogen sulfide instead will, if desired, yield respectively higher or lower proportions of sulfuric acid relative to the hydrogen bromide. In the process of the instant invention, all these reactions are availed of to simultaneously and continuously produce a relatively concentrated sulfuric acid, inclusive of oleum, and a gaseous hydrogen bromide, both of which products are of high economic value.

By continuously feeding into the reaction mixture a source of water at a rate approximating its rate of reaction with the other reactants, not only are the well known advantages of continuity of reaction attained, but in addition a gaseous hydrogen bromide and a concentrated sulfuric acid (including oleum) are provided as compared with prior art processes yielding aqueous solutions of hydrogen bromide and relatively dilute sulfuric acid. As a further feature of this invention, it has been found advantageous to employ as the source of water hydrobromic or sulfuric acid containing varying amounts of water in admixture or combination therewith. From this aspect, the process may be regarded as one for upgrading, dehydrating and/or concentrating hydrobromic or sulfuric acids. Thus, when aqueous hydrogen bromide is employed as the source of water, it is dehydrated and the proportion of gaseous hydrogen bromide in the products of the process is correspondingly increased. When a sulfuric acid solution is employed as the source of water, it is dehydrated or concentrated and the proportion of sulfuric acid in the products of the process is correspondingly increased. Even up to 100% sulfuric acid may be employed as the source of water, in which case dehydration thereof during the reaction will yield an oleum as one of the products. Further, by employing an aqueous hydrobromic or sulfuric acid as the source of water, the amount of water reacting in a given volume of reaction mixture at any one time may be more easily controlled and limited to achieve the desired results.

It will be understood that the continuous feed of a source of water referred to herein is inclusive of addition thereof in increments at spaced intervals. In accordance with one embodiment, the water is introduced, desirably as finely dispersed droplets, into and preferably at the bottom of the reaction mixture which is maintained at such a temperature and pressure that it remains liquid. Operation in accordance with the embodiment of the invention results in a desirable separation of the reaction products into different phases whereby their recovery is facilitated. Thus, as the water rises in the reaction mixture, it reacts with the bromine and reducing agent to form gaseous hydrogen bromide, which bubbles to the surface and escapes, and sulfuric acid which rises to the surface as a separate liquid phase. Accordingly, use of a relatively narrow, vertically disposed reaction vessel is advantageous in increasing the length of travel of the reactants and reaction products therethrough, ensuring a more complete reaction.

As the reaction proceeds, the bromine and reducing agent are depleted and must be replenished. In the preferred embodiment of this invention wherein sulfur is employed as the reducing agent, it has been found advantageous to replenish the reaction mixture by addition thereto of a previously prepared liquid mixture of sulfur and sulfur bromide, the mixture containing less than one atomic weight of bromine per atomic weight of sulfur, and to add the additionally required free bromine directly to the mixture. Although the exact ratio of bromine to sulfur in the reaction mixture at any one time is not critical except insofar as it should fall between about 2 and 30 atomic weights of bromine per atomic weight of sulfur, their depletion or removal from the reaction mixture takes place at the rate of 6 atomic weights of bromine per atomic weight of sulfur and they must be substantially continually replenished at rates which average out to this proportion. The sulfur and sulfur bromide, due to density differences, are preferably fed into the upper part of the reaction mixture, while the bromine is fed in at a lower point. In view of the excess bromine required for the reaction, the sulfur in the reaction mixture will be essentially in the form of sulfur-bromine compounds such as sulfur bromide and the like. The sulfur bromide in the reaction mixture reacts to form the desired products in accordance with the following equation:

$$S_2Br_2 + 8H_2O + 5Br_2 \rightarrow 2H_2SO_4 + 12HBr\uparrow$$

It will of course be understood that the reaction mixture may contain at any particular stage various reaction products intermediate the reactants and the desired final reaction products. However, all of these intermediates react in the presence of water and excess bromine to form the desired reaction products. In fact, the presence of the said intermediate compounds appears to have an accelerating and generally beneficial effect on the course of the reaction involved in the instant invention. It will accordingly be understood that the term "sulfur" employed herein and in the appended claims to designate the sulfur containing reducing agent in the reaction mixture is intended to include its compounds with bromine and/or oxygen and the like in which the sulfur is not in its highest state of oxidation. The term "sulfur bromide," as above indicated, has reference to the compound $S_2Br_2$. As the water source floats upward in the reaction mixture it reacts to form sulfuric acid and gaseous hydrogen bromide. The hydrogen bromide bubbles up through the concentrated sulfuric acid layer floating on the surface of the reaction mixture and is drawn off as a dry gas contaminated with some bromine. A further feature of this invention resides in the tendency of the sulfuric acid layer to function both as a trap or seal to deter the escape of bromine from the reaction mass and as a dehydrator to collect any unreacted water that may possibly rise to this level. Concentrated sulfuric acid is continuously removed from this layer and may be employed as such if the traces of bromine therein are unobjectionable, or it may be treated to remove the bromine. Similarly, the effluent gaseous dry hydrogen bromide may be employed as such, or it may be treated to remove the bromine.

Still further advantages of the process of the instant invention are based upon the flexibility of control and operation achieved thereby, and the smaller and less expensive pieces of equipment required therefor. It will be apparent that the reaction can be controlled, stopped and/or started again at will merely by controlling or stopping the feed of the source of water. The bromine and reducing agent feed should of course also be simultaneously controlled to prevent the reaction mass from overflowing and/or being disproportionated.

In another embodiment of this invention, instead of the above described vertical reaction system, the reaction may be carried out in a continuous manner by continuously feeding the reactants (water source, bromine, and $H_2S$, $SO_2$, S or liquid mixture of S and $S_2Br_2$) in substantially stoichiometric ratio into one end of a relatively long reaction vessel maintained under suitable reaction conditions, and separating the gaseous hydrogen bromide and sulfuric acid reaction products at the other end of the reaction vessel after completion of the reaction therein. The separation is easily accomplished, for example by gravity collection of the liquid sulfuric acid and separate removal of the gaseous hydrogen bromide. In this embodiment, the reaction vessel is preferably a horizontal tubular reactor, although it may of course be of different cross-sectional configuration, inclined from the horizontal, multi-stage, or the like.

Depending upon such factors as the desired rate $x$ of reaction, rate and speed of throughput, character of the reducing agent and source of water employed, and the like, it may in some instances be desirable to heat or cool and/or agitate the reaction mixture, and/or to carry out the reaction under pressure. Thus, the attainment of optimum results may in some cases require temperatures of about 90° C. or more, pressures of up to 2 or more atmospheres, application of a vigorous source of agitation and/or injection of one or more of the reactants in atomized or finely divided form and/or under pressure, or the like. The various expedients available for accomplishing same are well known to workers skilled in the art. Similarly, the reaction chamber may be baffled or packed to increase residence time therein and ensure better contact and more complete equilibrium between the reactants. In view of the corrosive nature of the reactants, reaction mass, and reaction products, the equipment should be glass, glass-lined or tantalum.

As a still further feature of this invention it has been found that the effluent hydrogen bromide and concentrated sulfuric acid products of the above process may be subjected to a purifying treatment simultaneously with the production of the above-described liquid feed mixture of sulfur and sulfur bromide. This may be accomplished by mixing such products with an amount of sulfur such that the atomic ratio of the bromine in such products to sulfur is less than 1:1. The bromine in these products will thus react with the sulfur to form a liquid mixture of sulfur and sulfur bromide which is fed into the main reaction mixture. This mixture of sulfur and sulfur bromide is a highly advantageous means for feeding sulfur into the main reaction mixture in view of its liquid nature at ordinary temperatures, thereby avoiding the problems which would arise from the necessity of employing solid sulfur. In the event that insufficient bromine is carried over in the gaseous hydrogen bromide and concentrated sulfuric acid products of the main reaction, additional free bromine can be introduced into or mixed with the sulfur and sulfur and bromide mixture to make up for this deficiency. The sulfur bromide formed is soluble in bromine and is also a solvent for sulfur, thereby facilitating the continuity and flexibility of this procedure.

While the effluent gaseous hydrogen bromide and concentrated sulfuric acid products of the main reaction may be separately mixed with the sulfur, it has been found highly advantageous, as a further feature of this invention, to mix all three substances together. In such a mixture the sulfuric acid will float up and form a separate liquid phase over the sulfur-sulfur bromide solution. Bromine contained in the sulfuric acid reacts with the sulfur to form sulfur bromide, and the sulfuric acid may be withdrawn at the top. The effluent hydrogen bromide is introduced adjacent the bottom of the mixture, and bromine contained therein likewise reacts with the sulfur as it bubbles up through the sulfur-sulfur bromide solution. After passing through the surface layer of concentrated sulfuric acid, it is withdrawn as a dry gas. The sulfur-sulfur bromide solution is continuously withdrawn at the bottom of the mixture and is fed into the main reaction mass.

Instead of or in addition to the above procedure, the gaseous hydrogen bromide from the main reaction mixture may be further purified by passing it through a mixture of sulfur and an organic solvent such as monochlorobenzene, in which mixture bromine compounds other than HBr will be retained. The sulfuric acid product of the main reaction mixture may be subjected to a heat treatment whereby sulfur and bromine compounds therein are vaporized off. This vapor, and the sulfur and sulfur bromide in the organic solvent may, after removal of the organic solvent from the latter mixture, be recycled into the main reaction mixture.

The attached drawing is a schematic illustration of a system which may be employed in carrying out the embodiment of this invention involving the use of sulfur as the reducing agent for reaction with water and bromine in a vertically disposed reactor, although the invention is not to be regarded as limited thereto. Reactor 1 is filled at all times to level 10 with a more or less homogeneous mixture of bromine, sulfur, and sulfur bromide, and may desirably be baffled, or filled with glass marbles or loosely packed glass wool in at least the lower half thereof. It is provided with jackets 6 and 7 for heating or cooling purposes if required. A source of water is introduced through pipe 8 into the bottom of reactor 1, preferably in the form of finely dispersed droplets. As the water source floats upwards, due to the difference in densities, it reacts in the lower portion of the reactor with the other reactants to form hydrogen bromide and sulfuric acid.

The sulfuric acid generated in the reaction is immiscible with the reaction mass and floats to the top to form a layer between levels 10 and 13. The hydrogen bromide generated in the reaction bubbles up through the reaction mass and through the layer of concentrated sulfuric acid which acts to inhibit the escape of bromine from the reaction mass, and collect any unreacted water which may possibly rise to level 10. The dry gaseous hydrogen bromide, containing some bromine, is withdrawn from reactor 1 through vapor line 16. The sulfuric acid is constantly withdrawn at 12 through line 5 provided with a constant level overflow loop to maintain a substantially constant volume of sulfuric acid in reactor 1 between levels 10 and 13.

Bromine is introduced through line 9 into reactor 1 at a rate controlled to maintain the upper interface level 10 of the reaction mass at a point just below the sulfuric acid overflow 12. This rate will of course be interrelated with the rate of feed of the liquid mixture of sulfur and sulfur bromide, which will in turn be interrelated with the rate of feed of sulfur into the system. The sulfur or liquid mixture of sulfur and sulfur bromide is fed into the upper part of reactor 1 at 11 to achieve the maximum rate of reaction.

In the illustrated embodiment, the effluent gaseous hydrogen bromide and concentrated sulfuric acid products withdrawn from reactor 1 are not withdrawn from the system at this stage, as could be done if desired, but are first fed into vessel 2 for admixture with the sulfur required for reaction in reactor 1. To facilitate handling and prevention of vapor leakage, the sulfur is fed into vessel 2 through line 15 preferably in a liquid, molten state. The sulfuric acid in line 5 is fed into the lower part of vessel 2 at 18, from whence it rises up through the denser sulfur-sulfur bromide solution in the vessel. As it rises, bromine contained therein immediately reacts with the dissolved sulfur to form sulfur bromide which is retained in the solution. The sulfuric acid forms a separate liquid phase between levels 17 and 22 and is continuously removed through overflow line 4. The hydrogen bromide from reactor 1 is fed through line 16 to the bottom of the liquid mixture in vessel 2 at 20 from whence it bubbles up through the mixture and the sulfuric acid layer to be withdrawn through line 14 as dry gaseous hydrogen bromide. Bromine in the bubbling hydrogen bromide reacts with the dissolved sulfur to form sulfur bromide. The sulfuric acid layer again tends to act as a seal, debrominator and dehydrator. The liquid sulfur-sulfur bromide mixture is continuously withdrawn from the bottom of vessel 2 at 19 and fed into reactor 1 at 11 through constant level loop 3 which acts to maintain the level of the mixture in vessel 2 at 17. In the event that insufficient bromine is carried over into vessel 2 from reactor 1 to liquify all the sulfur, additional bromine can be introduced directly into vessel 2 at 21 to make up for this deficiency.

The following example, in which parts and proportions are by weight unless otherwise indicated, is merely illustrative of one embodiment of the instant invention and is not to be regarded as limitative:

*Example*

Into a vertical, glass tube reactor is charged a mixture of 400 parts of bromine and 30 parts of sulfur, followed by 1000 parts of 99% sulfuric acid which forms a separate layer over the bromine-sulfur mixture. The lower part of the sulfuric acid layer is maintained at a temperature of 120 deg. C., and the upper part at 40 deg. C. The system is maintained under a pressure of 25 p. s. i.

The bromine-sulfur mixture in the lower part of the reactor is heated and maintained at 70 deg. C., and an 80% sulfuric acid solution is introduced through a dispersing or atomizing unit as very fine droplets into the bottom of the reactor at the rate of about 18 parts per hour. As the reaction rate increases, bromine is injected into the bottom of the reactor at the rate of about 19 parts per hour. One and one-quarter parts of sulfur as a liquid mixture of sulfur and sulfur bromide per hour is injected into the reactor below the sulfuric acid layer, a liquid mixture formed from 100 parts of bromine and 50 parts of sulfur. Molten sulfur is added to this scrubbing mixture at the rate of about 1¼ parts per hours, and additional bromine as required to maintain the mixture liquid. The scrubbed gaseous hyrogen bromide is finally passed through a suspension of sulfur in cold (20 deg. C.) mono-chlorobenzene to further purify it. The scrubbed sulfuric acid forms a separate liquid phase and is continuously removed. The scrubbing mixture is continuously fed into the reactor below the sulfur acid layer at a rate sufficient to provide about 1¼ parts of sulfur per hour.

While the above description has been restricted in its more specific aspects to a process wherein sulfur is employed as the reducing agent, it will be understood that the process of this invention may also be employed with sulfur dioxide or hydrogen sulfide as such reducing agent, with of course appropriate changes in the size or shape of equipment or location of the various feeds, hook ups and draw-offs necessitated by changed relationships in densities and proportions of reactants and reaction products and the like. Such changes may be made by those skilled in the art without departing from the scope of this invention.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

What we claim is:

1. A process for the continuous production of sulfuric acid and gaseous hydrogen bromide, which comprises continuously feeding into a reaction zone, containing bromine and sulfur and which is at such a temperature and pressure as to maintain the reaction medium in liquid state, water at a rate approximating its rate of reaction with said bromine and sulfur, and continuously removing gaseous hydrogen bromide and sulfuric acid from the reaction mixture.

2. A process for the continuous production of sulfuric acid and gaseous hydrogen bromide, which comprises continuously feeding into a reaction zone, containing bromine and sulfur and which is at such a temperature and pressure as to maintain the reaction medium in liquid state, aqueous sulfuric acid at a rate approximating its rate of reaction with said bromine and sulfur, and continuously removing gaseous hydrogen bromide and sulfuric acid from the reaction mixture.

3. A process for the continuous production of sulfuric acid and a gaseous hydrogen bromide, which comprises continuously feeding into a reaction zone, containing bromine and a liquid mixture of sulfur and sulfur bromide and which is at such a temperature and pressure as to maintain the reaction medium in liquid state, water at a rate approximating its rate of reaction with said bromine, sulfur and sulfur bromide, and continuously removing gaseous hydrogen bromide and sulfuric acid from the reaction mixture.

4. A process for the continuous production of sulfuric acid and a gaseous hydrogen bromide, which comprises continuously feeding into a reaction zone, containing bromine and a liquid mixture of sulfur and sulfur bromide and which is at such a temperature and pressure as to maintain the reaction medium in liquid state, aqueous sulfuric acid at a rate approximating its rate of reaction with said bromine, sulfur and sulfur bromide, and continuously removing gaseous hydrogen bromide and sulfuric acid from the reaction mixture.

5. A process for the continuous production of sulfuric acid and gaseous hydrogen bromide, which comprises continuously feeding into a reaction zone, containing bromine and sulfur and which is at such a temperature and pressure as to maintain the reaction medium in liquid state, water at a rate approximating its rate of reaction with said bromine, sulfur and sulfur bromide, removing and admixing the effluent gaseous hydrogen bromide with a liquid mixture of sulfur and sulfur bromide, and feeding the resulting liquid mixture of sulfur and sulfur bromide into said reaction zone.

6. A process for the continuous production of sulfuric acid and gaseous hydrogen bromide, which comprises continuously feeding into a reaction zone, containing bromine and sulfur and which is at such a temperature and pressure as to maintain the reaction medium in liquid state, aqueous sulfuric acid at a rate approximating its rate of reaction with said bromine, sulfur and sulfur bromide, removing and admixing the effluent gaseous hydrogen bromide with a liquid mixture of sulfur and sulfur bromide, and feeding the resulting liquid mixture of sulfur and sulfur bromide into said reaction zone.

7. A process for the continuous production of sulfuric acid and a gaseous hydrogen bromide, which comprises continuously feeding into a reaction zone, containing bromine and a liquid mixture of sulfur and sulfur bromide and which is at such a temperature and pressure as to maintain the reaction medium in liquid state, water at a rate approximating its rate of reaction with said bromine, sulfur and sulfur bromide, removing and admixing the sulfuric acid product with a liquid mixture of sulfur and sulfur bromide, and feeding the resulting liquid mixture of sulfur and sulfur bromide into said reaction zone.

8. A process for the continuous production of sulfuric acid and a gaseous hydrogen bromide, which comprises continuously feeding into a reaction zone, containing bromine and a liquid mixture of sulfur and sulfur bromide and which is at such a temperature and pressure as to maintain the reaction medium in liquid state, aqueous sulfuric acid at a rate approximating its rate of reaction with said bromine, sulfur and sulfur bromide, removing and admixing the sulfuric acid product with a liquid mixture of sulfur and sulfur bromide, and feeding the resulting liquid mixture of sulfur and sulfur bromide into said reaction zone.

9. A process for the continuous production of sulfuric acid and gaseous hydrogen bromide, which comprises continuously feeding into a reaction zone, containing bromine and sulfur and which is at such a temperature and pressure as to maintain the reaction medium in liquid state, a member of the group consisting of water, aqueous hydrobromic acid, and aqueous sulfuric acid at a rate approximating its rate of reaction with said bromine and sulfur, and continuously removing gaseous hydrogen bromide and sulfuric acid from the reaction mixture.

10. A process for the continuous production of sulfuric acid and a gaseous hydrogen bromide, which comprises continuously feeding into a reaction zone, containing bromine and a liquid mixture of sulfur and sulfur bromide and which is at such a temperature and pressure as to maintain the reaction medium in liquid state, a member of the group consisting of water, aqueous hydrobromic acid, and aqueous sulfuric acid at a rate approximating its rate of reaction with said bromine, sulfur and sulfur bromide, and continuously removing gaseous hydrogen bromide and sulfuric acid from the reaction mixture.

11. A process for the continuous production of sulfuric acid and a gaseous hydrogen bromide, which comprises continuously feeding into a reaction zone, containing bromine and a liquid mixture of sulfur and sulfur bromide and which is at such a temperature and pressure as to maintain the reaction medium in liquid state, a member of the group consisting of water, aqueous hydrobromic acid, and aqueous sulfuric acid at a rate approximating its rate of reaction with said bromine, sulfur and sulfur bromide, removing and admixing the effluent gaseous hydrogen bromide with a liquid mixture of sulfur and sulfur bromide, and feeding the resulting liquid mixture of sulfur and sulfur bromide into said reaction zone.

12. A process for the continuous production of sulfuric acid and a gaseous hydrogen bromide, which comprises continuously feeding into a reaction zone, containing bromine and a liquid mixture of sulfur and sulfur bromide and which is at such a temperature and pressure as to maintain the reaction medium in liquid state, a member of the group consisting of water, aqueous hydrobromic acid, and aqueous sulfuric acid at a rate approximating its rate of reaction with said bromine, sulfur and sulfur bromide, removing and admixing the sulfuric acid product with a liquid mixture of sulfur and sulfur bromide, and feeding the resulting liquid mixture of sulfur and sulfur bromide into said reaction zone.

References Cited in the file of this patent

UNITED STATES PATENTS 2,432,465   Goldschmidt et al. _____ Feb. 22, 1944

FOREIGN PATENTS 331,203   Great Britain _____ Oct. 31, 1935
551,789   Italy _____ Mar. 10, 1943